(12) United States Patent
Ishikura et al.

(10) Patent No.: US 6,341,527 B1
(45) Date of Patent: Jan. 29, 2002

(54) CAPACITIVE PRESSURE SENSOR

(75) Inventors: Yoshiyuki Ishikura; Shigeo Kimura; Takashi Masuda; Masaru Soeda; Toshiyuki Kataoka, all of Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/680,391

(22) Filed: Oct. 4, 2000

(30) Foreign Application Priority Data

Oct. 6, 1999 (JP) ............................................ 11-285234

(51) Int. Cl.[7] ................................................ G01L 9/12
(52) U.S. Cl. ....................................................... 73/718
(58) Field of Search ................ 73/718, 728; 361/283.1, 361/283.2, 283.3, 283.4

(56) References Cited

FOREIGN PATENT DOCUMENTS

WO    WO99/46570    9/1999

Primary Examiner—William Oen

(74) Attorney, Agent, or Firm—Blakely Sokoloff Taylor & Zafman

(57) ABSTRACT

A capacitive pressure sensor includes lower and upper wafers, a stationary electrode, first and second pads, a movable electrode, and a plurality of extraction electrodes. The lower wafer has a first capacitor forming portion and a first pad forming portion communicating with it. The upper wafer has a second capacitor forming portion, constituting a capacitor chamber together with the first capacitor forming portion, and a second pad forming portion communicating with it. The stationary electrode is formed on a bottom surface of the first capacitor forming portion. The first pad is formed on a bottom surface of the first pad forming portion and connected to the stationary electrode through a first interconnection. The movable electrode is formed on a bottom surface of the second capacitor forming portion to oppose the stationary electrode. The second pad is formed in the second pad forming portion and connected to the movable electrode through a second interconnection. The extraction electrodes are connected to the first and second pads and extracted outside through holes in the lower wafer. The lower and upper wafers are bonded to each other such that their pad forming portions are covered with their bonding surfaces.

12 Claims, 6 Drawing Sheets

US 6,341,527 B1

CAPACITIVE PRESSURE SENSOR

BACKGROUND OF THE INVENTION

The present invention relates to a capacitive pressure sensor and, more particularly, to a capacitive pressure sensor in which extraction electrodes made of molten solder are connected to a stationary electrode and movable electrode that constitute a capacitor element.

In a conventional capacitive pressure sensor, a thin wafer constituting a diaphragm and a thick wafer with a recess to form a base are adhered to each other, and the recess and diaphragm constitute a capacitor chamber for a capacitor element. Electrodes constituting the capacitor element are arranged in the capacitor chamber to oppose each other.

As shown in FIG. 9, a conventional capacitive pressure sensor 101 is comprised of a lower wafer 102, an upper wafer 103, extraction electrodes 104, a stationary electrode 105, a movable electrode 107, a reference electrode 109, a pad 106 for the stationary electrode 105, and pads 108 for the movable electrode 107 and reference electrode 109.

Both the lower and upper wafers 102 and 103 are substrates made of sapphire, silicon, glass, or alumina. The lower wafer 102 has a circular recessed capacitor forming portion 102a at its central portion excluding the periphery, and a plurality of pad forming portions 102b and 103b projecting outward from the outer circumference of the capacitor forming portion 102a. The upper wafer 103 is bonded to the periphery of the lower wafer 102 so as to cover the capacitor forming portion 102a and pad forming portions 102b and 103b. The upper wafer 103 constitutes a diaphragm as it is formed sufficiently thin such that it can be easily deflected in accordance with a change in external pressure.

As shown in FIG. 8, the circular movable electrode 107 is fixed in tight contact with the central portion on one surface of the diaphragm opposing the capacitor forming portion 102a, and the C-shaped reference electrode 109 is fixed in tight contact with the edge of the diaphragm to substantially surround the movable electrode 107. The circular stationary electrode 105 is fixed in tight contact with the lower wafer 102 to oppose the movable electrode 107 and reference electrode 109. The electrodes 105, 107, and 109 are connected to the extraction electrodes 104 that extend through the lower wafer 102. The movable electrode 107 and reference electrode 109 of the upper wafer 103 and the stationary electrode 105 of the lower wafer 102 oppose each other through a predetermined gap to constitute a capacitor element.

In this arrangement, when a diaphragm 103a is deflected by a pressure change, the movable electrode 107 is displaced accordingly to change the distance between the movable electrode 107 and stationary electrode 105. A change in capacitance between the stationary electrode 105 and movable electrode 107 is electrically detected to measure the pressure change indirectly. The reference electrode 109 is used to correct the capacitance detected between the stationary electrode 105 and movable electrode 107.

A method of manufacturing the capacitive pressure sensor described above will be briefly described. The lower and upper wafers 102 and 103 are prepared by processing a substrate made of sapphire or the like. Through holes 110 for forming the extraction electrodes 104 are formed in the lower wafer 102 by machining, a laser process, an ultrasonic process, or the like. A recess for the capacitor forming portion 102a is formed in the surface of the lower wafer 102 by dry etching.

A metal film is formed in the recess by vapor deposition, ion plating, sputtering, or the like, and is selectively etched to form the stationary electrode 105. The stationary electrode 105 is formed of a Pt/adhesion promoter film. To form the adhesion promoter film, Ti, V, Cr, Nb, Zr, Hf, Ta, or the like is used. Obviously, etching may not be performed and sputtering or the like may be performed through a shadow mask.

In the upper wafer 103, a metal film is formed by sputtering or the like on a substrate made of sapphire or the like, and is selectively etched to form the movable electrode 107, reference electrode 109, and pads 106 and 108. The pad 106 is formed of an Au/barrier film/adhesion promoter film. For example, Pt is used to form the barrier film, and Nb is used to form the adhesion promoter film. Obviously, instead of etching the metal film to form the electrodes, sputtering may be performed through a shadow mask to form the electrodes.

After that, the upper wafer 103 is adhered to the lower wafer 102, and the upper and lower upper wafers 103 and 102 are directly bonded to each other in an atmosphere with a temperature condition of 400° C. to 1,300° C. After bonding, molten solder 104a such as Sn—Ag solder is filled in the through holes 110 in the lower wafer 102 to form the extraction electrodes 104. If the lower and upper wafers 102 and 103 are positioned in advance such that the through holes 110 and the pads 106 and 108 oppose each other, the molten solder 104a filled in the through holes 110 attaches to the pads 106 and 108 to make reliable electrical connection.

The conventional pressure sensor described above has several problems. More specifically, in the upper wafer 103 constituting the diaphragm, the surface where the movable electrode 107 and reference electrode 109 are to be formed and the surface to be bonded to the lower wafer 102 are located on the same plane. If defective electrode formation or wafer misalignment occurs, a misaligned electrode may interfere with bonding the wafers.

Generally, when the lower and upper wafers are fabricated from the same material (e.g., sapphire), they are often bonded to each other by direct bonding. Since direct bonding requires planarity and small surface roughness in the bonding surfaces, a misaligned electrode largely decreases the bonding strength of the wafers. For this reason, conventionally, electrodes and lead portions attaching to them must be sufficiently distant from the bonded portions of the wafers. This requires an extra space to interfere with downsizing the sensor.

When forming the extraction electrodes 104, the molten solder 104a can flow into the capacitor chamber through interconnections to short-circuit the electrodes with each other. In order to prevent this, conventionally, as shown in FIG. 9, a step γ is formed to shorten the distance between the pads 106 and 108 and the openings of the through holes 110, so that the amount of solder that flows out is suppressed. With such a sharp step γ, however, it becomes difficult to form a metal film in a region δ during sputtering or the like, causing defective interconnection formation.

SUMMARY OF THE INVENTION

It is an object of the present invention to provide a capacitive pressure sensor in which defective bonding can be prevented from being caused depending on the material of a misaligned electrode when base members respectively having electrodes are to be bonded to each other.

It is another object of the present invention to provide a capacitive pressure sensor in which molten solder which forms extraction electrodes can be prevented from flowing into a capacitor chamber.

In order to achieve the above objects, according to the present invention, there is provided a capacitive pressure sensor comprising a first base member with a first main recess and a first sub-recess communicating with the first main recess, a second base member with a second main recess constituting a capacitor chamber together with the first main recess, and a second sub-recess communicating with the second main recess, the second main recess having a bottom surface that constitutes a diaphragm, a stationary electrode formed on a bottom surface of the first main recess, a first pad formed on a bottom surface of the first sub-recess and connected to the stationary electrode through a first interconnection, a movable electrode formed on a bottom surface of the second main recess to oppose the stationary electrode, a second pad formed in the second sub-recess and connected to the movable electrode through a second interconnection, and a plurality of extraction electrodes connected to the first and second pads and extracted outside through through holes formed in the first base member, wherein the first and second base members are bonded to each other such that the first and second sub-recesses are covered with bonding surfaces of the second and first base members.

DESCRIPTION OF THE PREFERRED EMBODIMENTS

The present invention will be described in detail with reference to the accompanying drawings.

Figure 1:
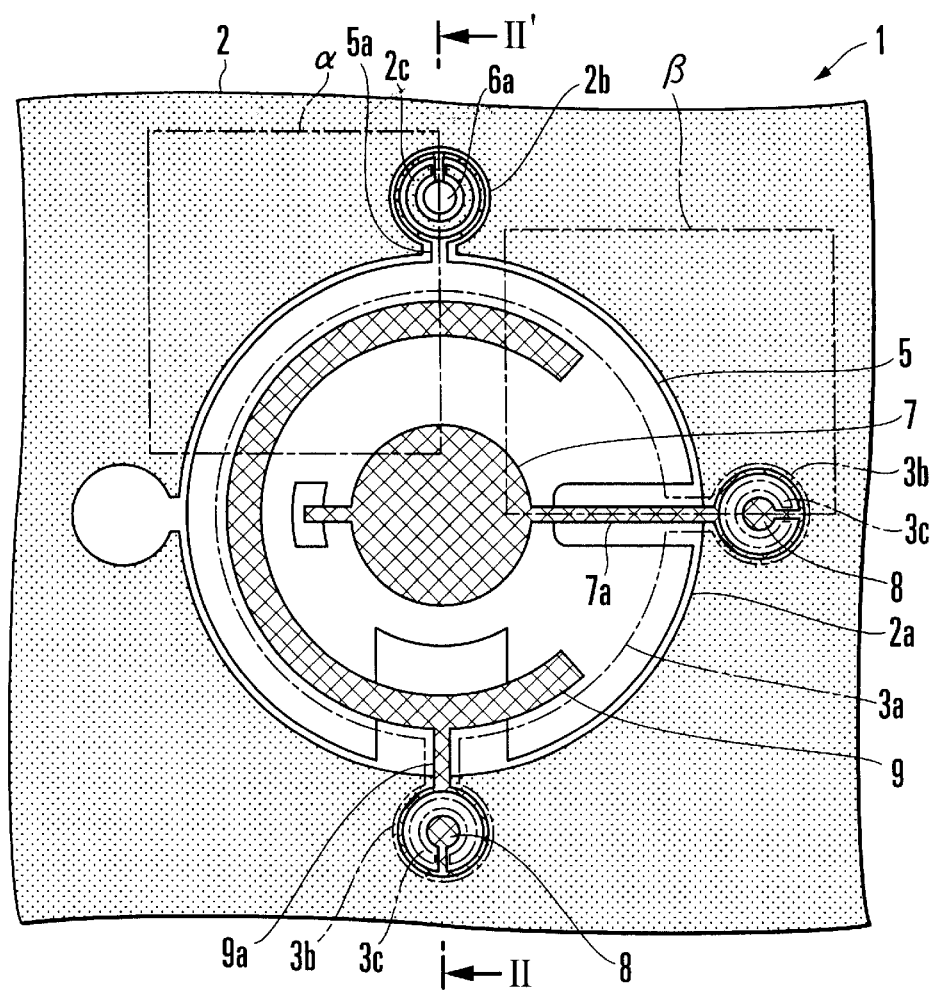
FIG. 1 is a plan view of a capacitive pressure sensor according to the first embodiment of the present invention, in which an upper wafer is omitted.
Figure 2:
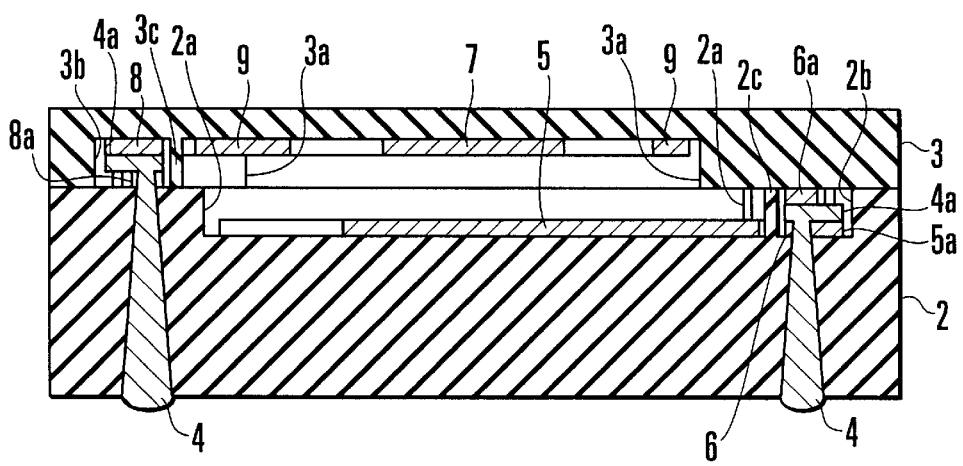
FIG. 2 is a sectional view taken along the line II–II' of FIG. 1.

FIGS. 1 and 2 show a capacitive pressure sensor according to the first embodiment of the present invention. As shown in FIG. 2, a capacitive pressure sensor 1 according to this embodiment is comprised of a lower wafer 2, an upper wafer 3, extraction electrodes 4, a stationary electrode 5, a movable electrode 7, a reference electrode 9, two pads 6 for the stationary electrode 5, counter pads 6a opposing the pads 6, pads 8 for the movable electrode 7 and reference electrode 9, and counter pads 8a opposing the pads 8. As shown in FIG. 1, the pads 6 are connected to the stationary electrode 5 through interconnections 5a, and the pads 8 are connected to the movable electrode 7 and reference electrode 9 through interconnections 7a and 9a, respectively.

Both the lower and upper wafers 2 and 3 are substrates made of sapphire, silicon, glass, or alumina. The lower wafer 2 has a circular recessed capacitor forming portion 2a formed at its central portion, and satellite-like small circular recessed pad forming portions 2b communicating with the capacitor forming portion 2a. The ring-like pads 6 for the stationary electrode 5 are formed on the bottom surface of the lower wafer 2 constituting the pad forming portions 2b to surround the openings of through holes 10. To correspond to the pad forming portions 2b, the counter pads 6a are formed on the lower surface of the periphery of the upper wafer 3 to oppose the pads 6.

The upper wafer 3 has a circular recessed capacitor forming portion 3a formed at its central portion, and a plurality of satellite-like small circular recessed pad forming portions 3b communicating with the capacitor forming portion 3a. The pads 8 for the movable electrode 7 and reference electrode 9 are formed on the upper surface of the upper wafer 3 constituting the pad forming portions 3b. To correspond to the pad forming portions 3b, the ring-like counter pads 8a are formed on the upper surface of the periphery of the lower wafer 2 to surround the openings of the through holes 10 so as to oppose the pads 8.

The bottom surface of the capacitor forming portion 3a of the upper wafer 3 constitutes a diaphragm as it is formed sufficiently thin such that it can be easily deflected in accordance with a change in external pressure. The upper and lower wafers 3 and 2 are bonded to each other at their peripheries so as to seal a capacitor chamber made up from the capacitor forming portions 2a and 3a. In this case, the capacitor forming portions 2a and 3a do not oppose each other, the pad forming portions 3a are covered with the upper surface of the periphery of the lower wafer 2, and the pad forming portions 2b are covered with the lower surface of the periphery of the upper wafer 3.

As shown in FIG. 1, the circular movable electrode 7 is fixed in tight contact with the central portion of the diaphragm (the bottom surface of the upper wafer 3) constituting the capacitor forming portion 2a, and the C-shaped reference electrode 9 is fixed in tight contact with the edge of the diaphragm so as to substantially surround the movable electrode 7. The circular stationary electrode 5 is fixed in tight contact with the lower wafer 2 to oppose the movable electrode 7 and reference electrode 9. The electrodes 5, 7, and 9 are connected to the extraction electrodes 4 that extend through the lower wafer 2, as will be described later.

As described above, the capacitor forming portion 3a of the upper wafer 3 and the capacitor forming portion 2a of the lower wafer 2 form the capacitor chamber. In the capacitor chamber, the movable electrode 7 and reference electrode 9 of the upper wafer 3 and the stationary electrode 5 of the lower wafer 2 oppose each other through a predetermined gap to constitute a capacitor element.

In this arrangement, when the diaphragm is deflected by a pressure change, the movable electrode 7 is displaced accordingly to change the distance between the movable electrode 7 and stationary electrode 5. Therefore, a change in capacitance between the stationary electrode 5 and movable electrode 7 is electrically detected to measure the pressure change indirectly. The reference electrode 9 is used to correct the capacitance detected between the stationary electrode 5 and movable electrode 7.

The pad forming portions 2b will be described in detail with reference to FIGS. 3A, 3B, and 5A.

Figures 3A, 3B:
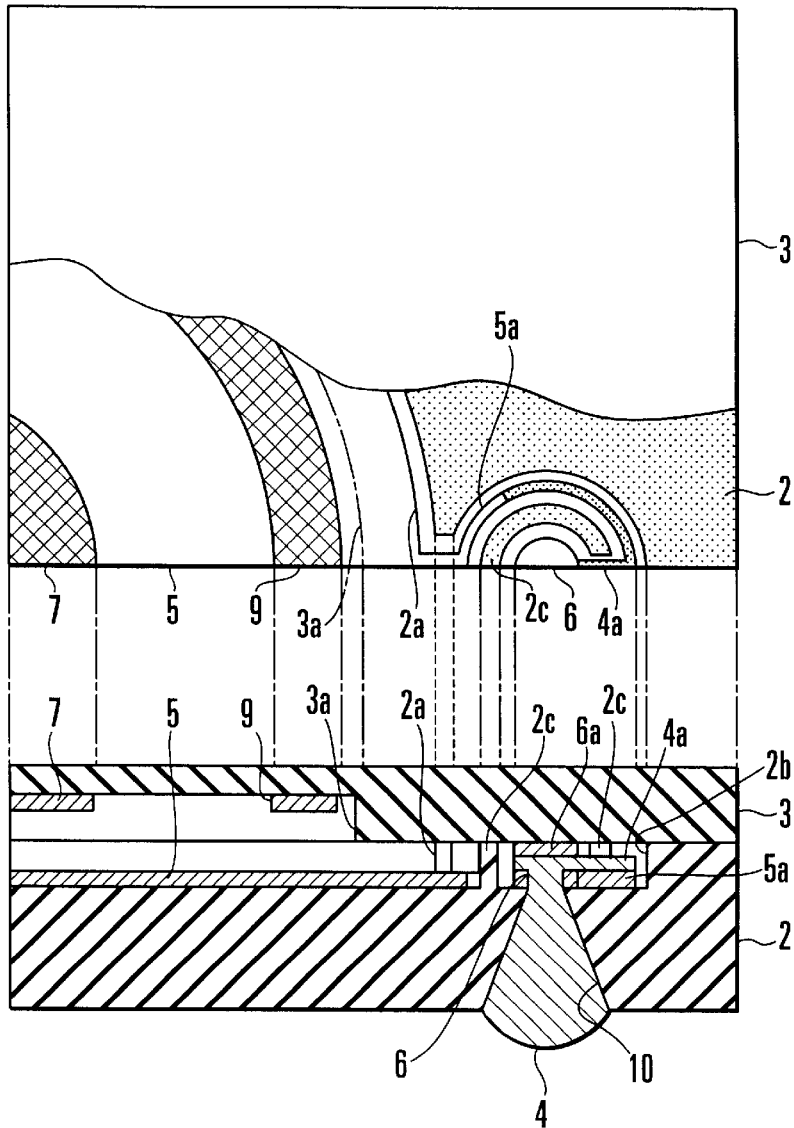
FIG. 3A is an enlarged plan view of a region α of FIG. 1.
FIG. 3B is a sectional view of FIG. 3A.
Figure 5A:
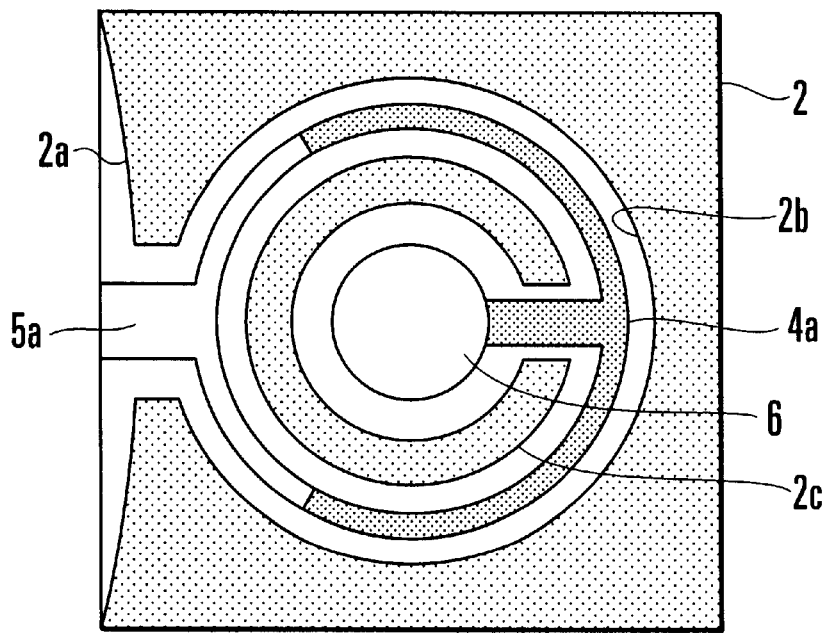
FIG. 5A is an enlarged plan view of a pad forming portion shown in FIG. 1.

As shown in FIGS. 3A and 5A, each pad forming portion 2b has a solder outflow preventive wall 2c to form a bypass for molten solder 4a. More specifically, the pad 6 and counter pad 6a with diameters smaller than that of the pad forming portion 2b are arranged at the central portion of the pad forming portion 2b, formed in the lower wafer 2, to oppose each other. The C-shaped solder outflow preventive wall 2c projects from the lower wafer 2 so as to surround the pad 6 and counter pad 6a. The solder outflow preventive wall 2c has a notch (opening) on a side opposite to the direction in which the interconnection 5a extends toward the electrode 5.

Part of the interconnection 5a forms a ring-like shape on the bottom surface (lower wafer 2) of the pad forming portion 2b so as to further surround the solder outflow preventive wall 2c. One end of the ring-like shape of the interconnection 5a is connected to the pad 6 through the notch of the solder outflow preventive wall 2c, and the other end is connected to the electrode 5 through the connecting portions of the capacitor forming portion 2a and pad forming portion 2b.

In the pad forming portion 2b with the above arrangement, the molten solder 4a flowing into the portion between the pad 6 and counter pad 6a through the through hole 10 in the lower wafer 2 flows into the pad forming portion 2b along the ring-like interconnection 5a. As the molten solder 4a flows along the bypass formed between the solder outflow preventive wall 2c and the wall surface of the pad forming portion 2b, inflow of the molten solder 4a into the capacitor forming portion 2a is prohibited.

Since the through hole 10 is formed with a taper shape such that its pad forming portion 2b side is narrow, and since the opening at its distal end has a diameter slightly smaller than those of the pads 6 and 6a, inflow of the excessive molten solder 4a to portions other than the pads 6 and 6a is further prohibited.

The pad forming portions 3b will be described in detail with reference to FIGS. 4A and 4B.

Figures 4A, 4B:
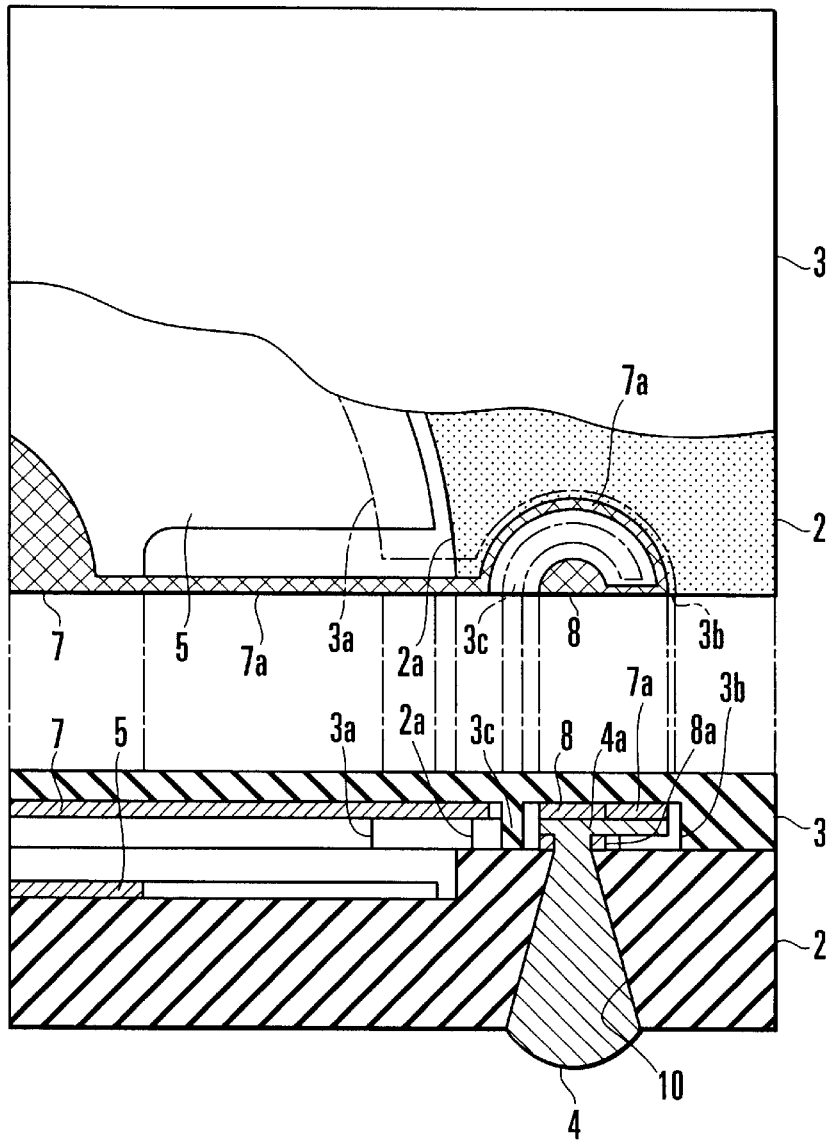
FIG. 4A is a plan view showing a region β of FIG. 1.
FIG. 4B is a sectional view of FIG. 4A.

As shown in FIG. 4A, each pad forming portion 3b has a solder outflow preventive wall 3c to form a bypass for the molten solder 4a. More specifically, the pad 8 and counter pad 8a with diameters smaller than that of the pad forming portion 3b are arranged in the pad forming portion 3b, formed in the upper wafer 3, to oppose each other. The C-shaped solder outflow preventive wall 3c projects from the upper wafer 3 so as to surround the pad 8 and counter pad 8a. Part of the interconnection 7a forms a ring-like shape on the bottom surface (upper wafer 3) of the pad forming portion 3b so as to further surround the solder outflow preventive wall 3c. One end of the ring-like shape of the interconnection 7a is connected to the pad 8 through the notch of the solder outflow preventive wall 3c, and the other end is connected to the electrode 7 through the connecting portions of the capacitor forming portion 3a and pad forming portion 3b.

In the pad forming portion 3b with the above arrangement, the molten solder 4a flowing into the portion between the pad 8 and counter pad 8a through the through hole 10 in the lower wafer 2 flows into the pad forming portion 3b along the interconnection 7a. As the molten solder 4a flows along the bypass formed between the solder outflow preventive wall 3c and the wall surface of the pad forming portion 3b, inflow of the molten solder 4a into the capacitor forming portion 3a is prohibited.

Since the through hole 10 is formed with a taper shape such that its pad forming portion 3b side is narrow, and since the opening at its distal end has a diameter slightly smaller than those of the pads 8 and 8a, inflow of the excessive molten solder 4a to portions other than the pads 8 and 8a is further prohibited. The pad forming portion 3b corresponding to the electrode 9 and interconnection 9a also has the same structure as this, and a description thereof will accordingly be omitted.

A method of manufacturing the capacitive pressure sensor described above will be described.

The lower and upper wafers 2 and 3 are prepared by processing a substrate made of sapphire or the like. More specifically, the through holes 10 for forming the extraction electrodes 4 are formed in the lower wafer 2 by machining, a laser process, an ultrasonic process, or the like. The surface region of the lower wafer 2 is removed by dry etching, and recesses for the capacitor forming portion 2a and pad forming portions 2b are formed in the lower wafer 2. Metal films are formed on the bottom surfaces of the recesses by vapor deposition, ion plating, sputtering, or the like, and are selectively etched to form the stationary electrode 5, interconnections 5a, and pads 6. Simultaneously, the counter pads 8a are formed around the lower wafer 2 to correspond to the pad forming portions 3b.

In the upper wafer 3, recesses for the capacitor forming portion 3a and pad forming portions 3b are formed by dry etching in a substrate made of sapphire or the like. Metal films are formed on the bottom surfaces of the recesses by sputtering or the like, and are etched to form the movable electrode 7, reference electrode 9, interconnections 7a and 9a, and pad 8. Simultaneously, the counter pads 6a are formed on the periphery of the upper wafer 3 to correspond to the pad forming portions 2b.

The electrodes 5, 7, and 9 and interconnections 5a, 7a, and 9a are formed of Pt/adhesion promoter films. For example, Ti, V, Cr, Nb, Zr, Hf, Ta, or the like is used to form the adhesion promoter films. The auxiliary pads 6, 8, and 8a are formed of Au/barrier film/adhesion promoter films. For example, Pt is used to form barrier films, and Nb is used to form the adhesion promoter films.

After that, the lower and upper wafers 2 and 3 are adhered to each other, and directly bonded to each other in an atmosphere with a temperature condition of 400° C. to 1,300° C. The resultant structure is set such that the lower wafer 2 is on the upper side, and the molten solder 4a is filled in the through holes 10, thereby forming the extraction electrodes 4 connected to the pads 6 and 8.

In the lower and upper wafers 2 and 3, in place of forming the metal films and thereafter etching them, sputtering may be performed through shadow masks to form the electrodes, interconnections, and pads.

In this arrangement, if the lower and upper wafers 2 and 3 are positioned such that the openings of the through holes 10 and the counter pads 6a and pads 6 oppose each other, the molten solder 4a can be prevented from attaching to the pads 6 and 6a and 8a and 8a to flow into the capacitor chamber. As shown in FIGS. 3A and 3B and 4A and 4B, the bypasses formed by the solder preventive walls 2b and 3b prohibit the molten solder 4a from flowing into the capacitor chamber.

The second embodiment of the present invention will be described with reference to FIG. 5B.

In the first embodiment, as described above, the C-shaped solder outflow preventive wall 2c is formed to have a notch extending in an opposite direction (direction of 180°) to the direction in which the interconnection 5a extends toward the capacitor chamber (electrode 5), thereby forming the bypass for the molten solder 4a. Depending on the layout of the solder outflow preventive wall 2c which forms the bypass, outflow of the solder can be prevented more effectively.

Figure 5B:
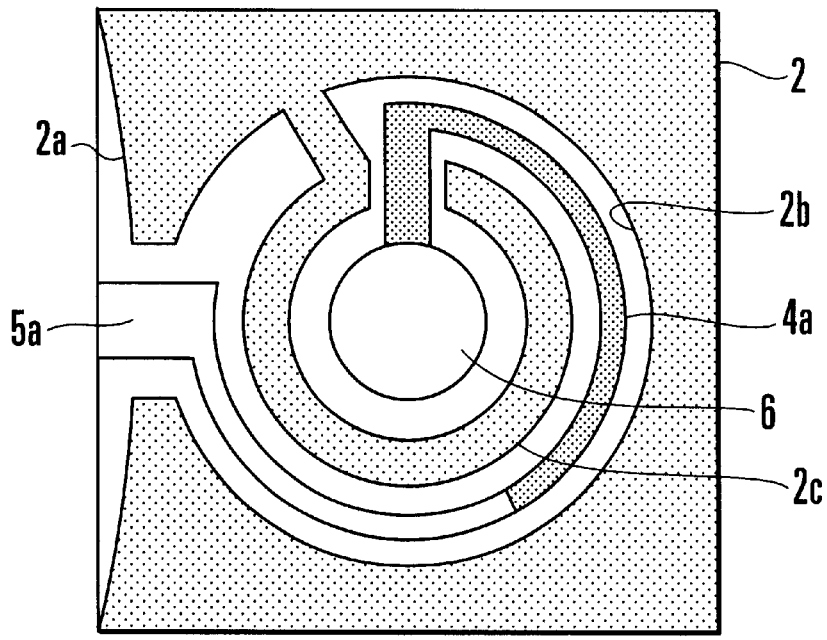
FIG. 5B is an enlarged plan view of the pad forming portion for explaining the second embodiment of the present invention.

More specifically, as shown in FIG. 5B, a solder outflow preventive wall 2c is formed with the shape of the question mark, and its one end is connected to the wall surface of a lower wafer 2, so that the length of the bypass can be remarkably increased. At this time, if the notch of the solder outflow preventive wall 2c extends in a direction forming an angle of 90° with the capacitor chamber and an interconnection 5a extends along an arc corresponding to remaining 270°, then the length of the bypass becomes larger than that of the first embodiment by 1.5 times. In this case, it suffices if the direction of the notch of the solder outflow preventive wall 2c forms an angle of 0° to 180° with reference to the extending direction of the interconnection 5a toward the electrode 5.

The third embodiment of the present invention will be described with reference to FIGS. 6 and 7.

Figure 6:
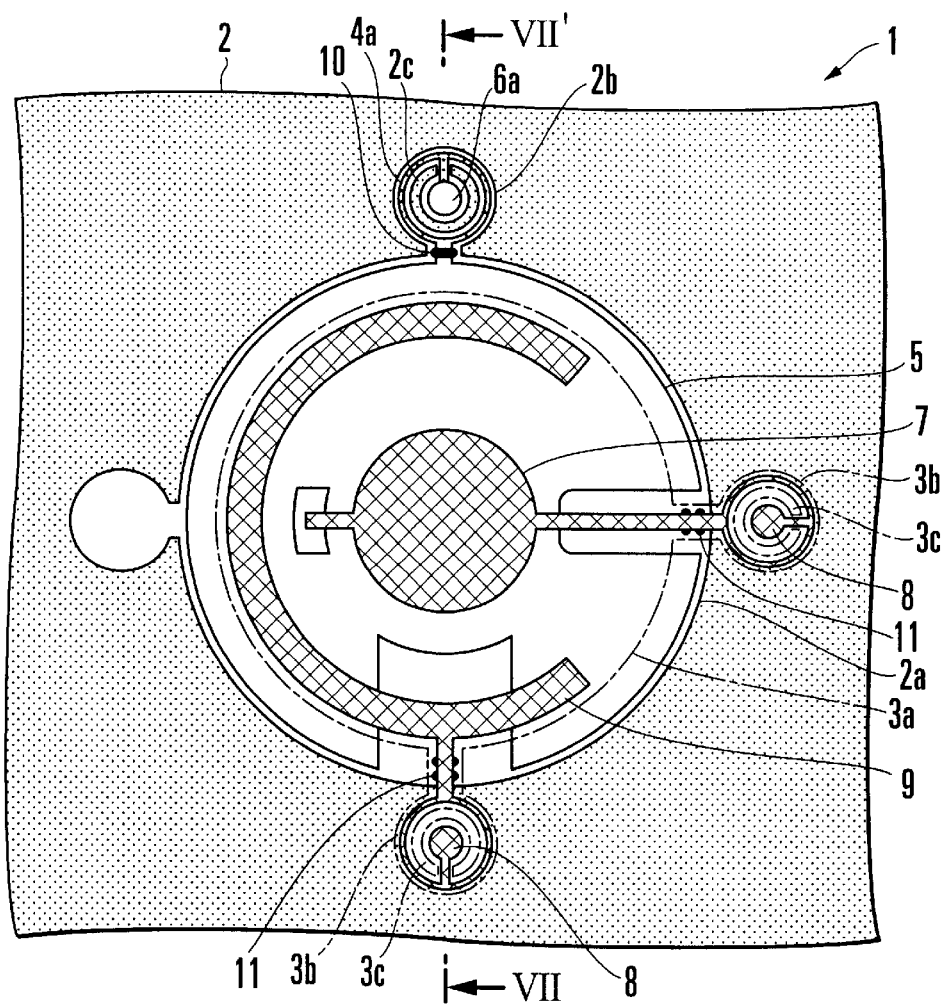
FIG. 6 is a plan view of a capacitive pressure sensor according to the second embodiment of the present invention, in which the upper wafer is omitted.
Figure 7:
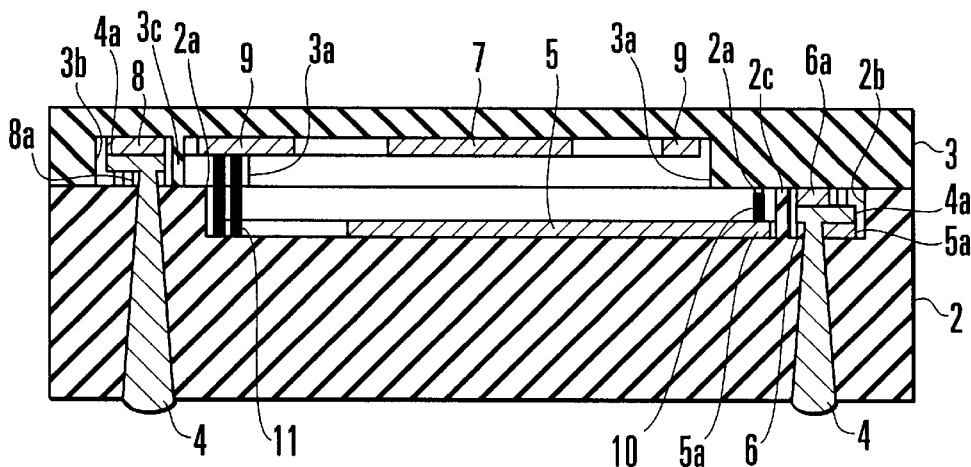
FIG. 7 is a sectional view taken along the line VII–VII' of FIG. 6.
Figure 8:
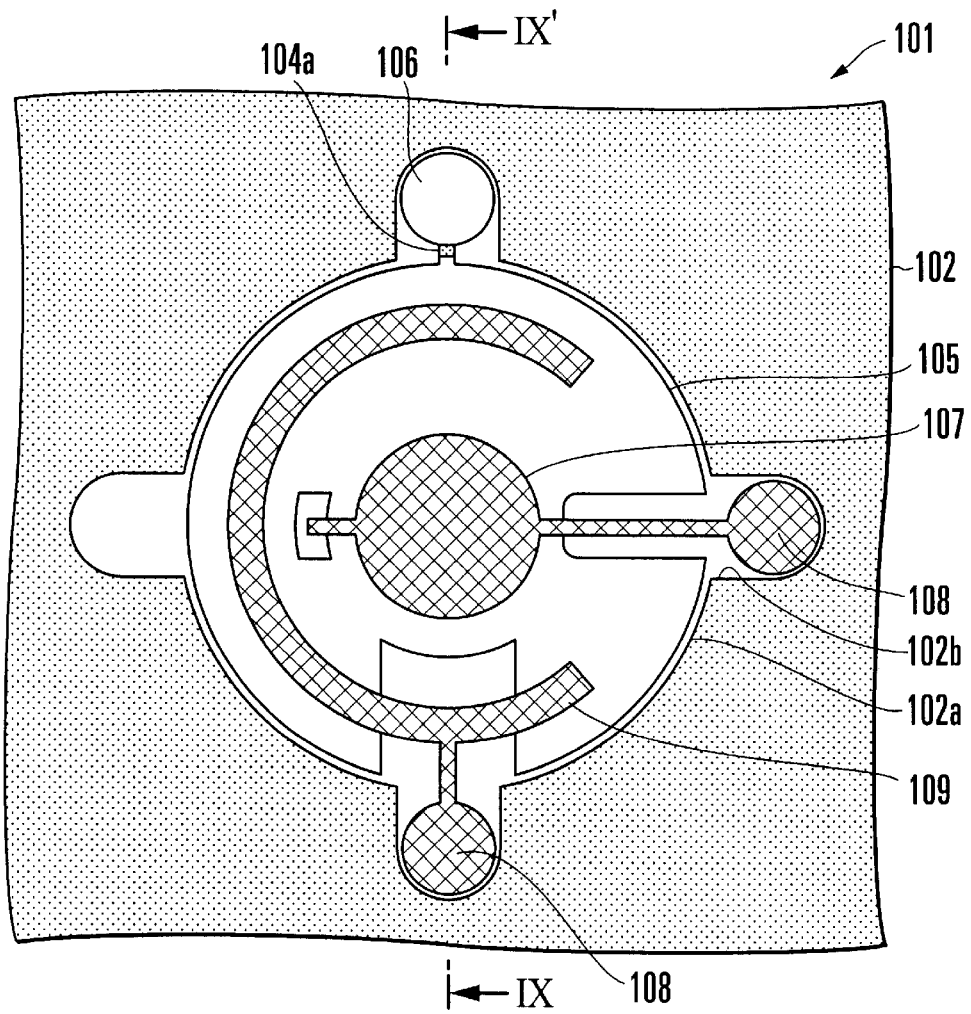
FIG. 8 is a plan view of a conventional capacitive pressure sensor.
Figure 9:
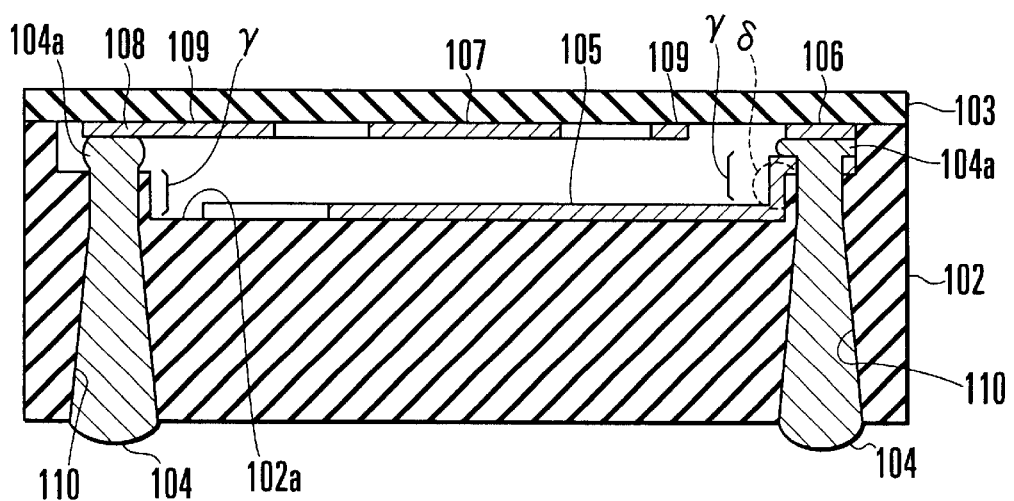
FIG. 9 is a sectional view taken along the line IX–IX' of FIG. 8.

In the third embodiment, in addition to the structure of the first embodiment, solder outflow preventive projections 10 and 11 are formed at the connecting portions of pad forming portions 2b and 3b and capacitor forming portions 2a and 3a, as shown in FIG. 6. The solder outflow preventive projection 10 projects from an upper wafer 3, and its distal end comes into contact with an interconnection 5a of a lower wafer 2 to close the outflow path. The solder outflow preventive projections 11 project from the lower wafer 2, and their distal ends come into contact with interconnections 7a and 9a of the upper wafer 3 to close the outflow path.

In this manner, when the solder outflow preventive projections 10 and 11 are formed, even if molten solder 4a flows out from the pad forming portions 2b and 3b, it is reliably prevented from flowing into the capacitor forming portions 2a and 3a. In particular, if the solder outflow preventive projections 10 and 11 are formed from a material with poorer solder wettability than that of the interconnections, outflow of the molten solder 4a can be prevented effectively.

In the above embodiment, the solder outflow preventive projections 10 and 11 disconnect solder flow on only the interconnections 5a, 7, and 9a. Alternatively, the solder outflow preventive projections 10 and 11 may disconnect the pad forming portions 2b and 3b and capacitor forming portions 2a and 3a from each other completely.

In the above embodiments, the solder outflow preventive walls 2c and 3c and solder outflow preventive projections 10 and 11 are formed integrally with the upper or lower wafer 3 or 2. Alternatively, separate members may be attached to serve as the solder outflow preventive walls or projections.

As has been described above, according to the present invention, since the stationary and movable electrodes are installed in recesses formed in the first and second base members, electrodes do not easily expose to the bonding surfaces of the first and second base members. Therefore, defective bonding of the first and second base members does not occur easily. Unlike in the conventional case, no extra space is required for sufficiently setting apart the bonding portions of the base members and electrode forming portions from each other, thus realizing downsizing the sensor.

Since the recesses of the respective base members do not overlap, the distance between the openings of the through holes for extraction electrodes and the pads formed on the opposing base member can be decreased, and the molten solder accordingly does not flow out easily. In particular, when the solder outflow preventive walls form the bypass for the molten solder, inflow of the solder into the capacitor chamber is suppressed to prevent short-circuiting of the electrodes.

When the solder outflow preventive projections are formed, inflow of the molten solder into the capacitor chamber can be prevented reliably. If the solder outflow preventive projections are made of a material with poorer solder wettability than that of the electrodes, inflow of the solder can be prevented more effectively.

What is claimed is:

1. A capacitive pressure sensor comprising:
   a first base member with a first main recess and a first sub-recess communicating with said first main recess;
   a second base member with a second main recess constituting a capacitor chamber together with said first main recess, and a second sub-recess communicating with said second main recess, said second main recess having a bottom surface that constitutes a diaphragm;
   a stationary electrode formed on a bottom surface of said first main recess;
   a first pad formed on a bottom surface of said first sub-recess and connected to said stationary electrode through a first interconnection;
   a movable electrode formed on a bottom surface of said second main recess to oppose said stationary electrode;
   a second pad formed in said second sub-recess and connected to said movable electrode through a second interconnection; and
   a plurality of extraction electrodes connected to said first and second pads and extracted outside through through holes formed in said first base member,
   wherein said first and second base members are bonded to each other such that said first and second sub-recesses are covered with bonding surfaces of said second and first base members.

2. A sensor according to claim 1, wherein said extraction electrodes are made of molten solder which is filled in said through holes, and is cooled and solidifies to attach to said first and second pads.

3. A sensor according to claim 2, further comprising solder outflow preventive walls in said first and second sub-recesses to constitute bypasses for the solder flowing out into a portion between said first and second sub-recesses and inner walls thereof.

4. A sensor according to claim 3, wherein
   said outflow preventive walls are arranged around said first and second pads in a substantially ring-like shape and have notches forming connection paths for said first and second interconnections to said first and second pads, and
   said first and second interconnections are arranged in a substantially ring-like shape so as to further surround said outflow preventive walls.

5. A sensor according to claim 4, wherein said notches of said outflow preventive walls are formed in directions different from directions in which said first and second interconnections extend toward said stationary and movable electrodes.

6. A sensor according to claim 5, wherein said notches of said outflow preventive walls are formed in directions to form angles of substantially 180° with the directions in which said first and second interconnections extend toward said stationary and movable electrodes.

7. A sensor according to claim 5, wherein
   said notches in said outflow preventive walls are formed in directions to form angles of 0° to 180° with the directions in which said first and second interconnections extend toward said stationary and movable electrodes, and said first and second interconnections are connected to said stationary and movable electrodes via arcs on sides opposite to the angles formed by said notches of said outflow preventive walls.

8. A sensor according to claim 5, wherein said outflow preventive walls are formed with a C shape.

9. A sensor according to claim 5, wherein said outflow preventive walls are formed with a shape of a question mark, and one end of each of said notches is connected to a corresponding one of said inner walls of said first and second sub-recesses.

10. A sensor according to claim 2, further comprising solder outflow preventive members for prohibiting outflow of the molten solder at a communicating portion of said first main recess and said first sub-recess, and a communicating portion of said second main recess and said second sub-recess.

11. A sensor according to claim 10, wherein said solder outflow preventive members disconnect outflow paths for the molten solder that flows out on said first and second interconnections from said first and second sub-recesses to said first and second main recesses.

12. A sensor according to claim 10, wherein said solder outflow preventive members are made of a material with a solder wettability poorer than those of said first and second interconnections.

* * * * *